(12) United States Patent
Wittenschlaeger

(10) Patent No.: US 9,178,604 B2
(45) Date of Patent: **\*Nov. 3, 2015**

(54) LAST MILE DATA DELIVERY SYSTEMS AND METHODS

(71) Applicant: Nant Holdings IP, LLC, Culver City, CA (US)

(72) Inventor: Thomas Wittenschlaeger, Flowery Branch, GA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/504,520

(22) Filed: Oct. 2, 2014

(65) Prior Publication Data

US 2015/0024676 A1    Jan. 22, 2015

Related U.S. Application Data

(63) Continuation of application No. 13/720,976, filed on Dec. 19, 2012, now Pat. No. 8,881,202.

(60) Provisional application No. 61/577,238, filed on Dec. 19, 2011.

(51) Int. Cl.
*H04N 7/20* (2006.01)
*H04B 7/185* (2006.01)

(52) U.S. Cl.
CPC .......... *H04B 7/1851* (2013.01); *H04B 7/18517* (2013.01)

(58) Field of Classification Search
USPC ............ 725/63–68; 455/3.02, 12.1, 13.1, 427
See application file for complete search history.

(56) References Cited

U.S. PATENT DOCUMENTS

2008/0297406 A1\* 12/2008 Dragne et al. ................. 342/352
2011/0044236 A1\* 2/2011 Giffin et al. ................... 370/316

\* cited by examiner

*Primary Examiner* — Mulugeta Mengesha
(74) *Attorney, Agent, or Firm* — Steven J Shattil

(57) ABSTRACT

A data delivery system leverages existing satellite infrastructure to deliver massive data sets (e.g., genomic data) to last-mile, remote or rural, locations. The system repurposes existing high-capacity satellite links normally used to broadcast entertainment content by creating customized channels specifically adapted to delivering large data sets to be stored upon computer systems.

23 Claims, 2 Drawing Sheets

LAST MILE DATA DELIVERY SYSTEMS AND METHODS

This application is a continuation of U.S. application Ser. No. 13/720,976, filed Dec. 19, 2012, which claims the benefit of priority to U.S. provisional application having Ser. No. 61/577,238, filed Dec. 19, 2011. These and all other referenced patents and applications are incorporated herein by reference in their entirety

FIELD OF THE INVENTION

The field of the invention is data delivery technologies

BACKGROUND

Last mile delivery of massive data sets can be quite problematic. For example, transferring data sets of a complete analyzed human genome can be quite problematic when the data set comprises gigabytes, if not terabytes, of information. While a fiber optic data center might be able to handle such a high load with ease, transferring that information outside of the data center to remote hospitals, point-of-care facilities, or other healthcare providers can be quite difficult without high-speed infrastructure set in place. Existing infrastructure to deliver such data sets to point-of-care facilities in remote locations lacks bandwidth and often relies on low capacity wireless channels or low capacity wired channels where the data delivery can take hours or even days.

Interestingly, many point-of-care facilities, including hospitals in remote locations, already have one or more high capacity data links that are under-utilized. More specifically, hospitals under-utilize high capacity satellite dish-based systems to obtain large amounts of broadcast entertainment data for their patients, while over-utilizing low capacity lines for critical health related data.

Others have put forth some effort toward distributing data processing tasks of various types through under-utilized systems. For example, U.S. Pat. No. 7,783,249 to Robinson titled "Playing Digital Content from Satellite Radio Media Based on Taste Profiles", filed Oct. 15, 2007, teaches a system that utilizes a user's computer to construct a customized virtual content channel that reflects the tastes of the local user. Similarly, U.S. patent application publication 2010/0268361 to Mantel et al. titled "Method of Apparatus for Multiplexing Audio Program Channels from One or More Received Broadcast Streams to Provide a Playlist Style Listening Experience to Users", filed on Dec. 23, 2008, describes using a local receiver to perform time division multiplexing to generate a user's personal playlist at the receiver. U.S. patent application publication 2011/0292898 to Wu et al. titled "Centralized Channel Selection Method and Apparatus for Wireless Networks in a Dense Deployment Environment", filed internationally on Feb. 18, 2009, also teaches systems that scans such satellite channels to discover which channels are being used effectively. Although Robinson, Mantel, and Wu are useful to distribute data processing filters to local servers, the cited art fails to teach systems that distribute data load using under-utilized satellite systems.

U.S. patent application 2006/0262876 to LaDue titled "Wave Matrix Mechanics Method and Apparatus", filed Aug. 24, 2005. LaDue teaches a system that virtually constructs wave state coordinates into simultaneous cascading functions for use in true spatial dimensional encoding for existing satellite channel topologies. LaDue's system, however, fails to teach methods that customize a satellite channel for a data set in a manner that a last-mile location can receive the data set in a cost effective fashion.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

It has yet to be appreciated that large data sets can be delivered to remote locations by repurposing under-utilized existing high capacity links. Thus there is still a need for data delivery systems and methods capable of transmitting large data to last mile locations.

SUMMARY OF THE INVENTION

The inventive subject matter provides apparatus, systems and method in which a data receiver effectively receives large data sets at a remote last-mile location. Such data receivers generally have a satellite communication interface that is configured to receive data from a data source through one or more satellites. Contemplated data sources include data warehouses comprising one or more computer memories configured to house large data sets within database structures, such as high performance computing facilities, genomic analysis computing engines, or point-of-care facilities. Such data sets could include data sets from human genomes (whole or only a portion of) and analyzed genomic data to historical data topologies of network-accessible media (i.e. archives of the Internet or a financial data warehouse).

The data receiver also generally has a network interface that is configured to communicatively couple with an externally networked device via a network, such as a computer system configured to receive data sets transmitted by a satellite transmitting to the satellite communication interface. The satellite communication interface and the network interface could be two separate interfaces, or could be a single interface that acts as a conduit from the transmitting satellite to the receiving external networked device. In either case, while the network interface could comprise one or more wireless connections, the network interface preferably comprises a terrestrial network interface link that could transmit data to the external networked device using a high-bandwidth infrastructure, such as optical or wired network systems. In an exemplary embodiment, the terrestrial interface link communicatively couples with a National Lambda Rail interface.

The data receiver could also be configured to have a communication controller coupled with the satellite communication interface and the network interface, which obtains a satellite-based channel definition through the network interface based upon one or more characteristics of one of the data sets being transmitted from the data source. Using the satellite-based channel definition, the communication controller could then configure the satellite communication interface to establish a satellite channel with one of the satellites transmitting data to the receiver. Contemplated satellite communication channels include TDMA, CDMA, SDMA, FDMA, PDMA, and PAMA channel access schemes. The receiver could then receive the data set through the satellite channel whole or piecemeal, and could then be configured to store the data, whole or piecemeal, on a computer readable medium, such as a memory or database configured to store such data sets.

The communication controller is preferably configured to synchronize the satellite channel with the data source in accordance with one or more synchronization functions. Such synchronization functions generally depend upon one or more communication parameters associated with the satellite-based channel definition. Exemplary synchronization functions include time functions, frequency functions, transmission link functions, security functions, and location functions.

The data receiver preferably has a single set top box containing the satellite communication interface, network interface, and communication controller as a single insular unit that could be easily transported and set up without needing to separately couple each of the components with one another. The set top box could be a digital video recorder that stores digital video data, and may have a computer readable medium that stores the data, or may be configured to transmit the data to a remote computer readable medium. In other embodiments, the digital video recorder could be configured as one or more separate units that are distributed about a room or a building to assist in building redundancy paths between the units.

When the data receiver is in use, the data receiver generally identifies a data destination (e.g., remote hospitals, point-of-care facilities, insurance companies, etc.) associated with a data set transmitted from a data source and constructs the satellite-based channel definition based upon characteristics of the data set and the data destination. The satellite-based channel definition could be adjusted to accommodate characteristics specific to the data set, for example a required min/max bandwidth, a required min/max transmission time, a data set size, a transfer latency, a data structure, a data set owner, authorizations, authentication, or a data set key. The definition could be set using one or more of channel parameters, for example a latency value, a bandwidth, a transmission link, a frequency, a wavelength, a timing selection, a security function, a key, or a synchronization function. The data receiver could then be configured (automatically or by a user) to be responsive to data communications from a satellite on a satellite-based channel that operates in accordance with the constructed satellite-based channel definition. The satellite could then transmit, from the data source, the data set over the satellite-based channel to the data receiver, which then stores at least a portion of the data set on a transitory or non-transitory computer readable medium. In an exemplary embodiment, the data receiver could be configured to receive one or more portions of the data set in accordance with one or more event triggering criteria, such as receiving a command to store additional portions of a data set or receiving a notice that a transmission satellite has data to send to the receiver.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to computer systems that send and receive data sets, various alternative configurations are also deemed suitable and may employ various computing devices including servers, interfaces, systems, databases, agents, peers, engines, controllers, or other types of computing devices operating individually or collectively. Such computing devices may be integrated into a single device, or may be nonintegrated devices that are located proximate to the receiving network or computer readable medium storing the data set (or portion of the data set). Alternatively, various computing components may be located at a remote site. One should appreciate that computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including generating one or more signals designed to configure a data receiver to construct a satellite-based communication channel, where the signal includes information related to a data set to be transmitted.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within a networking context, "coupled to" or "coupled with" is also construed to mean "communicatively coupled with".

Figure 1:
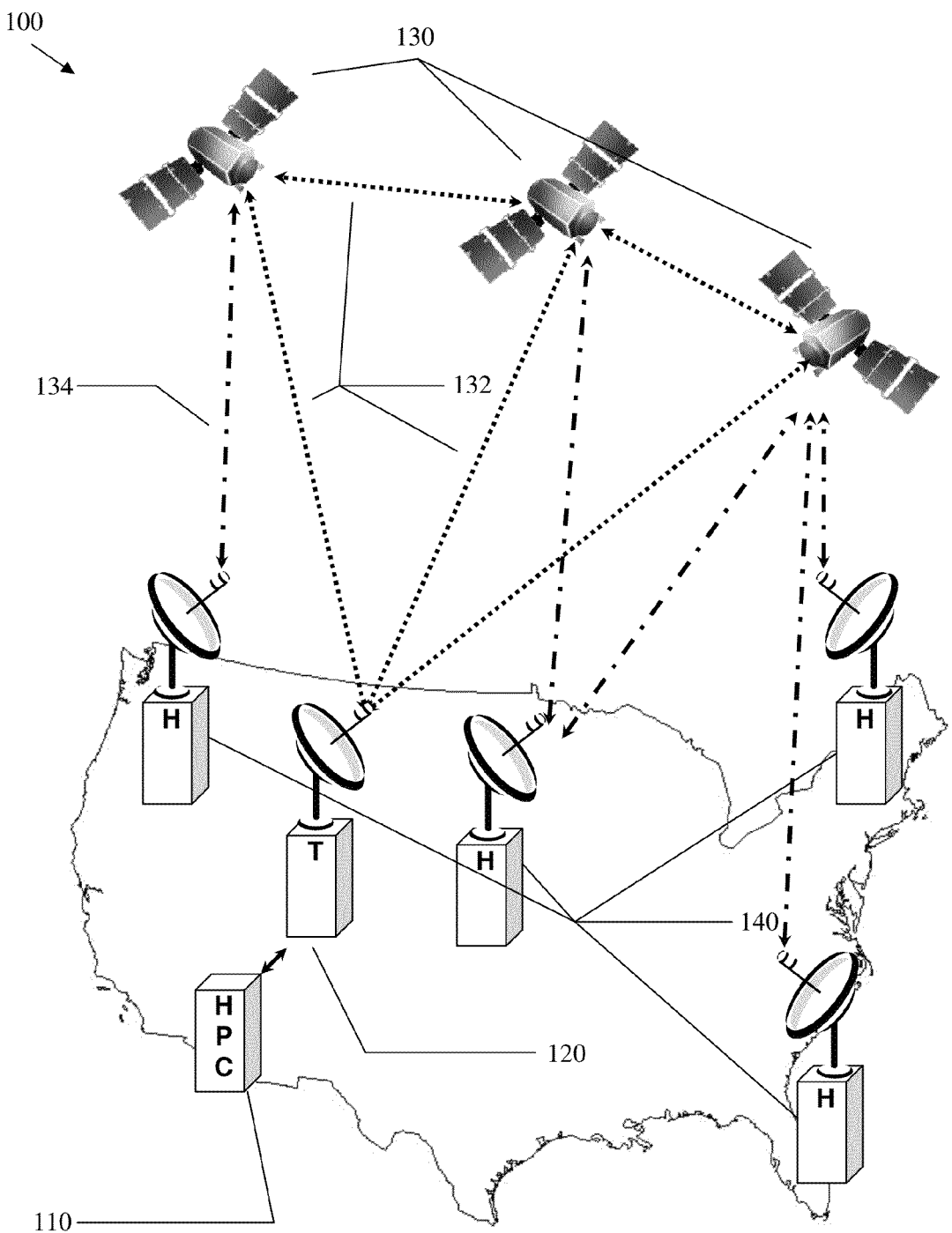
FIG. 1 is a schematic of last mile data delivery ecosystem.

FIG. 1 illustrates an exemplary last mile data delivery system 100 having a data source 110, satellite transmission systems 120 (labeled "T"), satellites 130, and data destinations 140 (labeled "H"). Although the ecosystem is illustrated as covering the continental United States, one should appreciate the ecosystem could be generalized to cover a smaller geographical area or expanded to cover the entire globe, including space stations. The data source 110 could be some sort of High Performance Computer facility (labeled "HPC") that houses and possibly processes large data sets, for example portions of the human genome or archives of records, and is configured to transmit the data sets (whole or piecemeal) to data destinations 140, illustrated here as exemplary remote or rural hospital facilities, thus the label "H". The terms "data source" and "data destination" represent end points of a communication channel. One skilled in the art will appreciate that data sources include at least a data transmitter (e.g., server, radio, etc.) and that data destinations include at least a data receiver (e.g., client, radio receiver, etc.). Further, each end point could comprise a transmitter and a receiver allowing both sides to exchange data with the other.

Normally, when transmitting such large data sets to data destination hubs, bottlenecks will occur since wired technology infrastructure is either insufficient or is over-utilized. Here, the exemplary last mile data delivery system 100 overcomes that insufficiency by utilizing under-utilized satellite bandwidth. The satellite network preferably includes existing infrastructure present at remote locations. For example, data destinations 140 may have existing satellite dish antennas used to obtain entertainment content for patients. Example existing satellite infrastructures include DISH Network®, Viasat®, Gilat®, DirectTV®, or other existing infrastructure. Thus, many remote or rural locations have the ability to download content at will. However, the existing infrastructure lacks the ability to exchange massive data sets in a timely cost effective fashion A data source operating as a HPC facility generally stores one or more massive data sets on a computer readable medium (e.g., disk array, SAN, NAS, RAID, etc.), possibly an analyzed genome or processed medical imaging data. Regardless of the type of data, the data set must be sent from the data source 110 to one or more data destinations 140. In rural data destination locations, terrestrial links or cellular have poor capability to transmit such large data sets (e.g., greater than 100 Gigabytes).

Preferably the data source 110 identifies one or more data destinations 140 associated with the data set. In some embodiments, the data destination 140 sends a request or query for the data set, possibly based upon an identity of a patient (e.g., name, patient identifier, primary healthcare physician, etc.) or some other identifier. Such a request may be sent using the satellite uplink system, or may be sent using any other event trigger, such as a letter, fax, telephone call, or text message. In other embodiments, data source 100 might have received raw data from one of the data destinations 140. When processing of the raw data sufficiently progressed, the data source could then associate the processed data set with the data destination information that was sent with the raw data.

Data source 110 is functionally coupled to a satellite transmission system 120, which is illustrated here euphemistically as a satellite uplink system, such as an existing DISH Network® transmission facility. The transmission facility generally transmits using satellite uplink network links 132 (dotted lines), and the satellites 130 then transmit last mile data sets 134 to data destinations 140 using special communication channels (dot—dash lines) that are virtually separated from other communication channels currently used by the current satellite infrastructure. Data source 110 could construct the satellite-based channel definition based on characteristics of the data set or data destination. One should appreciate that a "channel" is considered to be a custom communication conduit through which the data source could send at least a portion of the data set, where the conduit comprises one or more communication parameters adjusted to facilitate transfer of the data set. Thus, each tuple comprising the data source, data destination, and data set could give rise to a tuple-specific channel having tuple-specific properties, rather than merely utilizing existing available statically defined links within the satellite ecosystem.

Data set properties could vary from data set to data set. Exemplary properties include data set size, a required bandwidth, a required transmission time, an urgency, a priority, a transfer latency, a data structure (e.g., package-based, headers, blocks, etc.), a data set owner, authorizations, authentications, one or more security keys, or other characteristics of the data. A computing system at the data source 110 could then map one or more of the characteristics to available properties of existing satellite links 132 via one or more rule sets. For example, if a data set is required to be transferred quickly in a set amount of time, the data source could search for links that could be aggregated to achieve the transfer, distributing portions of the data set across two or more satellites to transmit effectively.

Similarly, the data destination properties could also vary from data destination to destination, where such properties could also affect the constructed channel definition. Exemplary data destination properties could include data receiver capabilities, storage capacity, geo-location, data receiver network address (e.g., IP address, MAC address, receiver identifier, etc.), or other data destination properties that could affect reception of the data set.

A computer system at data source 110 aggregates information from the data set or data destination properties to determine the required or optional characteristics of a satellite channel capable of supporting the data set transfer. The computer system could then map the properties, or values associated with the properties, to channel parameters via one or more rule sets. The resulting channel parameters could be set according to the rules to arrive at the satellite-based channel definition. One should appreciate that the satellite-based channel destination could include required parameters or optional parameters to account for variability at the data destination. For example, an optional parameter might include a variable latency having a varying cost. Therefore, if the data destination requires low latency, the data destination could confirm extra payment for access to a low latency channel.

Such an approach allows the satellite communication system owner to adjust satellite links according priority, urgency, or other factor in real-time in exchange for a fee. For example, content delivery could be de-prioritized in favor of an urgent data set. Exemplary channel parameters that could be set within a satellite-based channel definition include a latency, a bandwidth, a transmission link, a frequency, a wavelength, a preferred transmission band, a timing selection, a security value, a key, a synchronization function, data set or receiver instructions, or other parameters that describe the nature of the satellite channel. In some embodiments, the satellite channel remains in existence for a limited time. Once the data set is transmitted the satellite channel could be decommissioned.

Data source 110 could then use the satellite-based channel definition to configure a data receiver located at one of the data destinations 140. The data receiver at the data destination could then be configured via one or more techniques. In some embodiments, data source 110 could send the satellite-based channel definition over a satellite link to the data receiver at the data destination. In other embodiments, the data source could send the satellite-based channel definition over a terrestrial link; possibly via an interface to the National Lamba Rail (see URL www.nlr.net). The satellite-based channel definition could be exchanged via a serialized format, XML for example, and would likely not require substantial bandwidth. One should keep in mind that the satellite links might lack flexibility to transmit generic data such as the satellite-based channel definition when the data receiver is not expecting such a transmission. Therefore, sending the definition via a terrestrial link, even a slow link, is considered feasible, if not preferable.

One aspect of configuring the data receiver could include synchronizing the data receiver with a data transmitter located at the data source according to synchronization functions within the channel definition. The step of synchronizing could be configured to take place using either the satellite network or a terrestrial network, such as the Internet. Such an approach allows the data source to leverage existing physical satellite links without changing the nature of the actual links. For example, one or more existing links might be dedicated to content delivery. Such links could be repurposed by using time divisional multiplexing where portions of the data set could be transmitted in small windows on the link according to a time-based synchronization function. The data receiver and transmitter could remain synchronized based on time obtained from GPS or other accurate time sources. The synchronization function could be a function of at least one of the following parameters: time, frequency, transmission link, security, location (e.g., satellite location, geo-location, etc.), or even based on characteristics of the data set (e.g., packets, chunks, hashes, etc.). When the receiver and transmitter are synchronized, the data source could begin transferring at least portions of the data according the synchronization function. The data receiver receives the portions accordingly under prescribed conditions of the synchronization function. Example techniques that could be suitably adapted for use in an established the channel including one or more of the following: TDMA, CDMA, FDMA, SDMA, PDMA, or PAMA.

In some embodiments, the satellite channel could include one or more event triggered conditions that indicate when data should be expected to arrive. Such an approach allows the satellite infrastructure to optimize and/or prioritize certain data sets over one another to send data without interfering in general content delivery. For example, when the receiver detects a prescribed event (e.g., low utilization of content, time-based events, etc.), the receiver could begin recording portions of the data set.

Once the satellite channel has been established, data source 100 could transmit the data set, or at least portions of the data set, to the data receiver at one of the data destinations 140 according to the parameters of the satellite-based channel definition. Transmission of the data set could cause the data receiver at the data destination to store at least portions of the data on one or more non-transitory computer readable media. In some embodiments, the satellite-based channel definition, or the data set itself, could include instructions for the data receiver on how to store the data or where to store the data. The transmission could require data source 110 to send the data set over a high capacity terrestrial link, the National Lamba Rail for example, to satellite transmission station 120, which in turn sends the data set via satellite uplinks 132 to satellites 130. Satellites 130 could then send one or more portions of the data set via the established satellite channel 134 to the data receiver at the data destination 140.

Consider a use-case where a remote Alaskan hospital has one or more existing DISH Network® receivers possibly operating as a set top box or a digital video recorder. The hospital requests a full genomic workup of a patient. The hospital sends the request; perhaps by phone, cellular network, low bandwidth network, or other network, to the genome HPC facility. In response, the HPC facility constructs a desired satellite channel definition describing the nature of a satellite channel capable of handling the transfer. The definition is transmitted to the hospital and configures the local receivers to be responsive to a satellite channel. Further, the HPC facility also sends the definition to the DISH Network base station or controller, which in turn configures the satellite links to conform to the definition. Further, the HPC facility delivers the data set to the DISH Network base station, which forwards the data to the data receiver via the established satellite channel.

Figure 2:
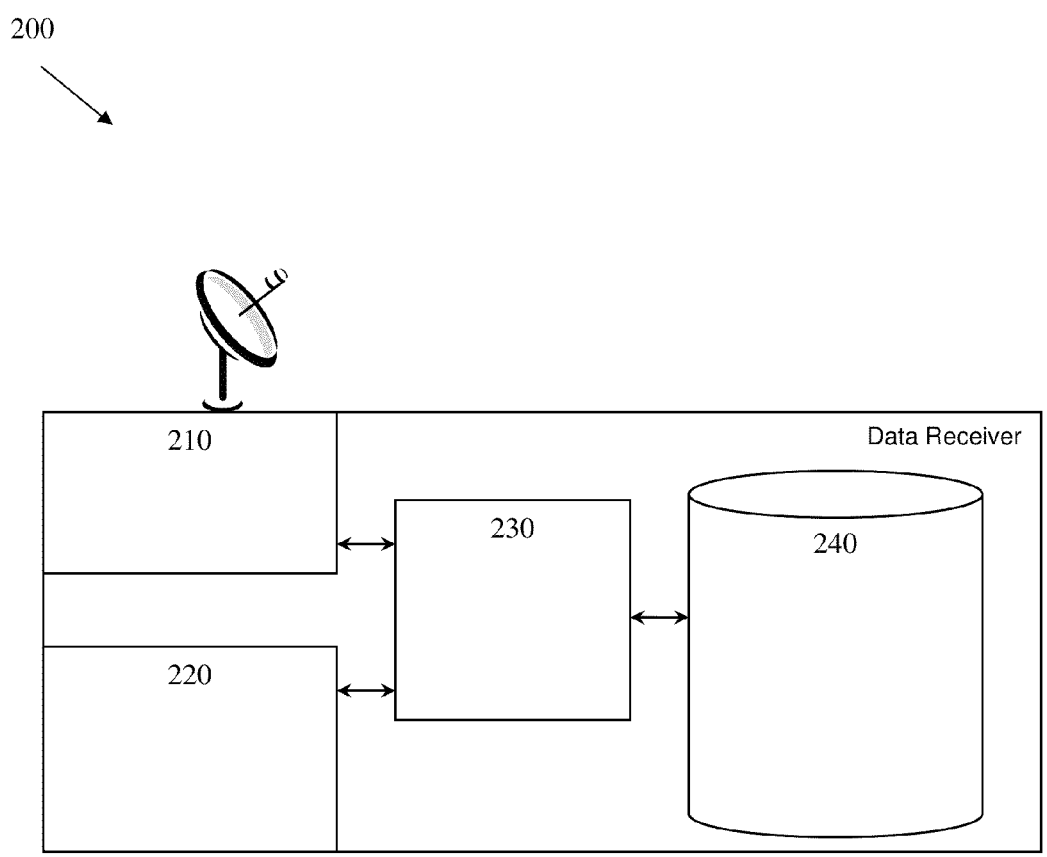
FIG. 2 is a schematic of a data receiver.

FIG. 2 illustrates an exemplary data receiver 200 having a satellite communication interface 210, network interface 220, communication controller 230, and computer readable medium 240, all integrated in a single set top box. While shown here euphemistically as a set top box, data receiver 200 could be configured as separate components distributed about a room or building, and could include digital video recorders or other suitable electronic devices as discussed above. Contemplated manufacturers of such electronic devices could include Motorola, Scientific Atlanta, or Samsung, as they have experience in constructing set top boxes for receiving satellite video and audio images, and could configure their existing systems to receive specialized data sets over newly constructed communication channels. In some embodiments, the network interface 220 and satellite communication interface 210 could be the same interface, while in other embodiments, they could be distinct from one another.

Satellite communication interface 210 is preferably configured to receive communication signals obtained from one or more satellites, such as those shown in FIG. 1. Exemplary signals include those carried by C-Band, S-Band, K-Band, Ku-Band, Ka-Band, or other bands utilized in satellite communications. Regardless of the type of signal received, the satellite communication interface could be further configured to adjust one or more communication parameters to establish a satellite channel as discussed previously.

Network interface 220 could include a terrestrial link capable of communication with remote nodes on a network. Exemplary network interfaces include wired interfaces (i.e. Ethernet or NLR connectors), wireless interfaces (i.e. satellite uplinks or WAN), optical interfaces, or other known interfaces to networks. In some embodiments, the network interface couples to the Internet through a wired or wireless connection. In some embodiments, network interface 220 may have a reduced capacity relative to satellite interface 210 due to the nature of the interface or the nature of the network connection.

Contemplated data receivers also generally include a communication controller 230 coupled with the interfaces. Preferred communication controllers are configured to obtain one or more satellite-based channel definitions over the network interface, 220 or satellite interface 210, possibly in a serialized format. Communication controller 230 uses the definitions to configure satellite communication interface 210 to be receptive to a satellite channel over which a data set will be sent by a remote data source. For example, communication controller 230 could configure the satellite communication interface to accept data on a satellite channel operating according to at least one of the following: TDMA, CDMA, SDMA, FDMA, PDMA, or PAMA. Further satellite communication interface 210 could be configured to synchronize with a data transmitter at a data source (not shown) according to one or more synchronization functions. Example synchronization functions could be based on time, frequency, available transmission links, security functions (e.g., keys, hashes, seeds, etc.), or even location.

In some embodiments, communication controller 230 instructs the data source (not shown) to encrypt the data set in accordance with some sort of encryption algorithm, such as a public/private key system, ensuring that only communication controller 230 is able to de-encrypt and access the data set. Such encryption could be of paramount importance when dealing with human genomic data.

Data receiver 200 could also include a computer readable media 240 capable of storing data sets or channel definitions on computer readable media. Computer readable media 240 could be any suitable database system, such as a transitory or non-transitory memory or file system. In some embodiments, the database could be local or within the data receiver (e.g., a file system on hard drive), while in other embodiments the database could be accessible via a network local to the data receiver. For example, the database could include an Electronic Medical Record system accessible over a LAN via the network interface.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A satellite communication system comprising:
   a satellite communication interface configured to receive data from at least one satellite in a satellite network;
   a network interface configured to receive data from a data source via an alternative network; and
   a communication controller coupled with the satellite communication interface and the network interface, and configured to:
   negotiate with the data source over the alternative network to establish a synchronization function associated with a data set;
   obtain a satellite channel definition, including the synchronization function, via the network interface;
   establish the satellite communication interface as a destination end-point of a satellite channel via the at least one satellite according to the satellite channel definition and the synchronization function; and
   receive at least a portion of the data set from the data source through the satellite channel via the satellite communication interface.

2. The system of claim 1, wherein the satellite communication interface couples with a satellite dish antenna configured to communicate with the at least one satellite.

3. The system of claim 1, wherein the network interface couples with at least one of the following: an Ethernet network, a wireless network, an optical network, a phone network, a cellular network, a terrestrial network, and a low bandwidth network.

4. The system of claim 1, wherein the satellite channel definition depends on data set properties of the data set.

5. The system of claim 4, wherein the data set properties include at least one of the following: a size, a required bandwidth, a require transmission time, an urgency, a priority, a latency, a data structure, an owner, an authorization, an authentication, and a security key.

6. The system of claim 4, wherein the communication controller is further configured to negotiate with the data source by sending at least one of the data set properties to the data source over the network interface.

7. The system of claim 1, wherein the satellite channel definition comprises satellite channel parameters.

8. The system of claim 7, wherein the satellite channel parameters comprise at least one of the following: a latency, a bandwidth, a transmission link, a frequency, a wavelength, a preferred transmission band, a timing selection, a security value, a key, and a receiver instruction.

9. The system of claim 1, wherein the satellite channel definition depends on data destination properties of a data destination for the data set.

10. The system of claim 9, wherein the data destination proprieties include at least one of the following: data receiver capabilities, storage capacity, geo-location, and network address of the network interface.

11. The system of claim 9, wherein the data destination is associated with a hospital.

12. The system of claim 1, wherein the data source comprises a high performance computing facility.

13. The system of claim 1, wherein the data source comprises a storage array.

14. The system of claim 1, wherein the data set comprises a portion of a genome.

15. The system of claim 14, wherein the portion of the genome comprises a portion of a human genome.

16. The system of claim 1, wherein the data set comprises records from an archive.

17. The system of claim 1, wherein the data set comprises medical imaging data.

18. The system of claim 1, wherein the satellite channel comprises aggregated satellite links.

19. The system of claim 18, wherein the communication controller is configured to receive portions of the data set distributed across at least two links of the aggregated satellite links.

20. The system of claim 1, wherein the satellite channel comprises a varying cost.

21. The system of claim 1, wherein the synchronization function comprises at least one of the following: a time function, a frequency function, a transmission link function, a security function, and a location function.

22. The system of claim 1, wherein the satellite channel includes at least one event triggering condition indicating when data is expected to arrive.

23. The system of claim 22, wherein the event triggering condition depends on at least one of the following: a low utilization and a time.

* * * * *